United States Patent
Kang et al.

(10) Patent No.: US 10,480,435 B2
(45) Date of Patent: Nov. 19, 2019

(54) EGR AND REFORMATE FRACTION ESTIMATION IN A DEDICATED EGR ENGINE

(71) Applicant: GM Global Technology Operations LLC, Detroit, MI (US)

(72) Inventors: Jun-mo Kang, Ann Arbor, MI (US); Gregory P. Matthews, West Bloomfield, MI (US); Martino A. Casetti, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 45 days.

(21) Appl. No.: 15/927,467

(22) Filed: Mar. 21, 2018

(65) Prior Publication Data
US 2019/0293011 A1    Sep. 26, 2019

(51) Int. Cl.
| F02D 41/00 | (2006.01) |
| F02D 41/24 | (2006.01) |
| F02D 41/14 | (2006.01) |
| F02D 41/02 | (2006.01) |
| F02D 13/02 | (2006.01) |

(Continued)

(52) U.S. Cl.
CPC ..... *F02D 41/0082* (2013.01); *F02D 41/0077* (2013.01); *F02D 41/0235* (2013.01); *F02D 41/1444* (2013.01); *F02D 41/2416* (2013.01); *F02B 37/18* (2013.01); *F02D 13/0215* (2013.01); *F02D 41/0002* (2013.01); *F02D 41/30* (2013.01); *F02P 5/04* (2013.01)

(58) Field of Classification Search
CPC ............ F02D 41/0082; F02D 41/0077; F02D 41/2416; F02D 41/1444; F02D 41/0235; F02D 13/0215; F02D 41/0002; F02D 41/30; F02P 5/04; F02B 37/18
See application file for complete search history.

(56) References Cited

U.S. PATENT DOCUMENTS 8,291,891 B2   10/2012  Alger, II et al.
9,091,233 B2    7/2015  Hardman
(Continued)

OTHER PUBLICATIONS

Chadwell et al, "A Demonstration of Dedicated EGR on a 2.0 L GDI Engine," SAE Int. J. Engines 7(1):2014, doi:10.4271/2014-01-1190.

*Primary Examiner* — Brandon D Lee

(57) ABSTRACT

A method of operating a dedicated-EGR engine includes providing a rich air-fuel mixture to a dedicated cylinder; combusting the rich air-fuel mixture in the dedicated cylinder; modeling the combustion of the rich air-fuel mixture in the dedicated cylinder; estimating the composition of the combustion products in the dedicated cylinder based on interpolation of chemical reaction models of stoichiometric and rich combustion. The method further includes mixing the combustion products from the dedicated cylinder with air to produce an intake mixture; estimating a mass fraction of reformate and a mass fraction of burned gas in the intake mixture; providing the intake mixture to the intake ports of all of the cylinders of the dedicated-EGR engine; combusting an air-fuel mixture in a non-dedicated cylinder of the engine; and controlling an engine control parameter based on the estimated mass fractions of reformate and burned gas in the intake mixture.

19 Claims, 5 Drawing Sheets

(51) Int. Cl.
    *F02P 5/04*     (2006.01)
    *F02D 41/30*     (2006.01)
    *F02B 37/18*     (2006.01)

(56) References Cited

U.S. PATENT DOCUMENTS

| | | |
|---|---|---|
| 9,534,567 B2 | 1/2017 | Ulrey et al. |
| 2012/0204844 A1* | 8/2012 | Gingrich ............ F02B 27/0215 123/568.11 |

* cited by examiner

EGR AND REFORMATE FRACTION ESTIMATION IN A DEDICATED EGR ENGINE

INTRODUCTION

The present disclosure relates to operation of a dedicated exhaust gas recirculation (dedicated-EGR) engine. A dedicated-EGR engine is an internal combustion engine having a plurality of cylinders, one of which, referred to as the dedicated cylinder, is dedicated to providing EGR gas to the intakes of all of the plurality of cylinders. The dedicated cylinder is operated at an air-fuel ratio rich of stoichiometry, such that its exhaust contains reformates such as $H_2$ and CO that are beneficial in stabilizing combustion when recirculated to the other non-dedicated cylinders.

During certain engine operating condition, for example during load transients, engine operation may need to be adjusted to compensate for excessive or insufficient reformates being produced in the dedicated cylinder. While sensing the composition of the gas mixture in an intake manifold of a dedicated-EGR engine can provide useful information for controlling engine operation, it would be advantageous to avoid the cost of a sensor suitable for measuring the gas composition.

Thus, while current dedicated-EGR systems achieve their intended purpose, there is a need for a new and improved system and method for determining the mass and composition of the EGR stream.

SUMMARY

According to several aspects, a method of operating a dedicated-EGR engine includes providing a rich air-fuel mixture to a dedicated cylinder, combusting the rich air-fuel mixture in the dedicated cylinder, and modeling the combustion of the rich air-fuel mixture in the dedicated cylinder. The disclosed method further includes estimating the composition of the combustion products in the dedicated cylinder based on interpolation of chemical reaction models of stoichiometric and rich combustion. The method also includes mixing the combustion products from the dedicated cylinder with air to produce an intake mixture and estimating a mass fraction of reformate and a mass fraction of burned gas in the intake mixture. The method further includes providing the intake mixture to the intake ports of all of the cylinders of the dedicated-EGR engine. The method also includes combusting an air-fuel mixture in a non-dedicated cylinder of the engine, and controlling an engine control parameter effective to influence combustion in the non-dedicated cylinder, wherein the value to which the engine control parameter is determined based on the estimated mass fraction of reformate and the estimated mass fraction of burned gas in the intake mixture.

In an additional aspect of the present disclosure, the step of controlling an engine control parameter comprises controlling fuel injection timing.

In another aspect of the present disclosure, the step of controlling an engine control parameter comprises controlling fuel injection quantity.

In another aspect of the present disclosure, the step of controlling an engine control parameter comprises controlling spark timing.

In another aspect of the present disclosure, the step of controlling an engine control parameter comprises controlling throttle position.

In another aspect of the present disclosure, the step of controlling an engine control parameter comprises controlling an EGR bypass valve.

In another aspect of the present disclosure, the step of controlling an engine control parameter comprises controlling a turbocharger waste gate.

In another aspect of the present disclosure, the step of controlling an engine control parameter comprises controlling engine intake valve timing or engine exhaust valve timing.

In another aspect of the present disclosure, the air-fuel mixture in the non-dedicated cylinder is adjusted to achieve overall stoichiometry at a catalytic converter disposed downstream of the non-dedicated cylinder.

According to several aspects, a system to operate a dedicated-EGR engine, the system includes a controller configured to control provision of a rich air-fuel mixture to a dedicated cylinder, control combustion of the rich air-fuel mixture in the dedicated cylinder, and model the combustion of the rich air-fuel mixture in the dedicated cylinder. The controller is further configured to estimate the composition of the combustion products in the dedicated cylinder based on interpolation of chemical reaction models of stoichiometric and rich combustion, estimate a mass fraction of reformate in an intake mixture comprising combustion products from the dedicated cylinder and air, and estimate a mass fraction of burned gas in the intake mixture. The controller is also configured to control provision of the intake mixture to the intake ports of all of the cylinders of the dedicated-EGR engine, control combustion of an air-fuel mixture in a non-dedicated cylinder of the engine, and control an engine control parameter effective to influence combustion in the non-dedicated cylinder, wherein the value to which the engine control parameter is determined based on the estimated mass fraction of reformate and the estimated mass fraction of burned gas in the intake mixture.

According to several aspects, a controller includes a processor and a non-transitory computer-readable medium containing instructions that, when executed, perform the method including the steps of controlling provision of a rich air-fuel mixture to a dedicated cylinder, controlling combustion of the rich air-fuel mixture in the dedicated cylinder, and modeling the combustion of the rich air-fuel mixture in the dedicated cylinder. The disclosed method also includes estimating the composition of the combustion products in the dedicated cylinder based on interpolation of chemical reaction models of stoichiometric and rich combustion. The method further includes estimating a mass fraction of reformate in an intake mixture comprising the combustion products from the dedicated cylinder and air and estimating a mass fraction of burned gas in the intake mixture. The method also includes controlling provision of the intake mixture to the intake ports of all of the cylinders of the dedicated-EGR engine, controlling combustion of an air-fuel mixture in a non-dedicated cylinder of the engine; and controlling an engine control parameter effective to influence combustion in the non-dedicated cylinder, wherein the value to which the engine control parameter is determined based on the estimated mass fraction of reformate and the estimated mass fraction of burned gas in the intake mixture.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Exhaust gas recirculation (EGR) is an effective way to increase fuel economy as well as to reduce NOx emissions of an internal combustion engine. EGR effectively decreases NOx emissions due to lower peak combustion temperature. Lower combustion temperature also reduces heat transfer and thus improves efficiency of the engine. Additionally, EGR slows the combustion reaction rate, thereby preventing knock. However, an excess level of EGR can destabilize combustion and result in partial burn or misfire. The presence of reformates such as CO and $H_2$ in the EGR can aid in stabilizing combustion. When the level of reformates deviates from the desired reformate level, for example during engine speed and/or load transients, spark timing needs to be adjusted to compensate for the effect of excessive or insufficient reformates. Knowing the level of reformates in the intake manifold allows spark timing to be controlled or fuel mass in the dedicated cylinder to be adjusted to achieve a desired level of reformates.

Figure 1:
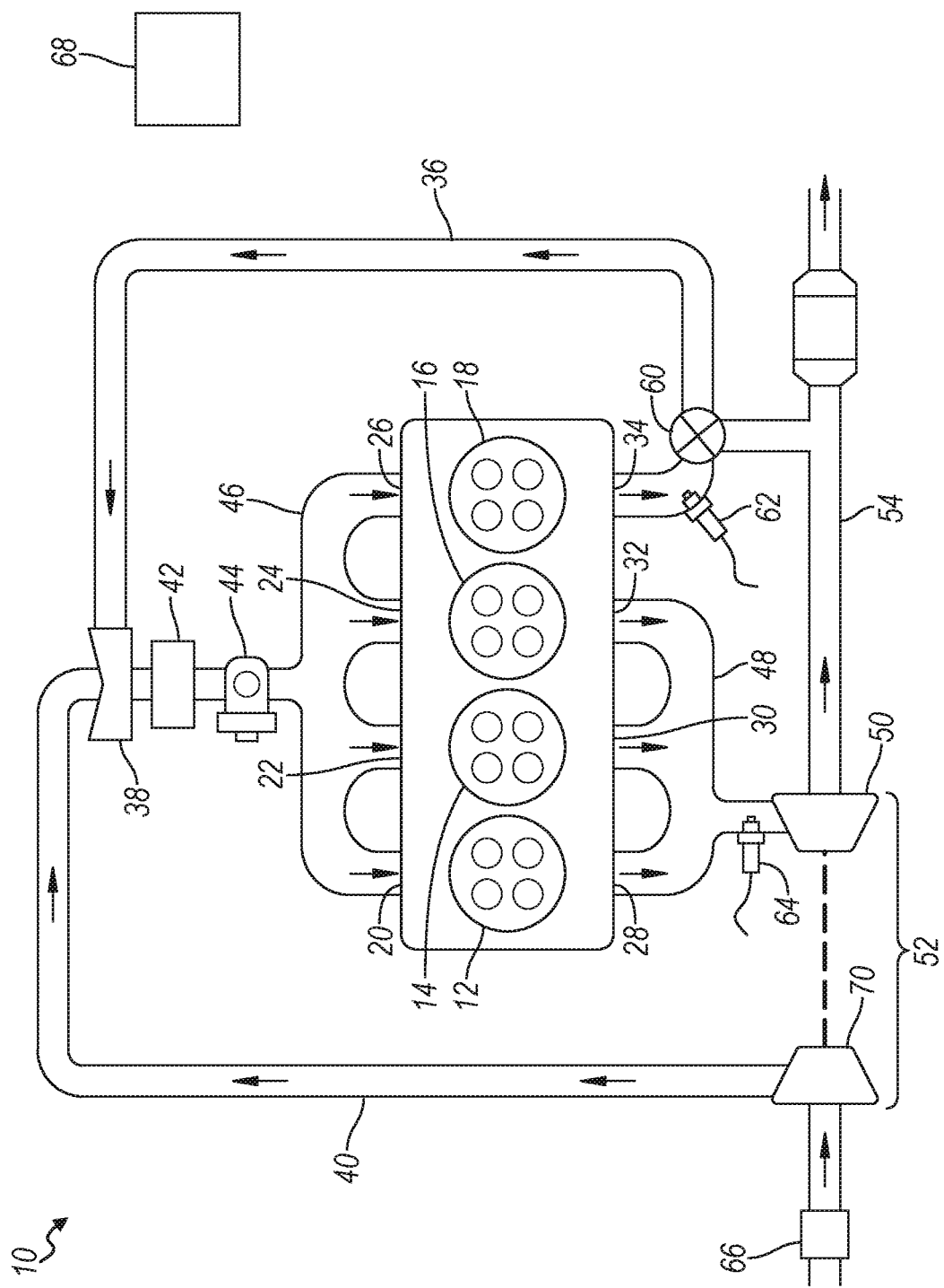
FIG. 1 is a depiction of an engine system that includes a dedicated cylinder according to an exemplary embodiment.

Referring to FIG. 1, an exemplary internal combustion engine 10 has a plurality of cylinders 12, 14, 16, 18 in which combustion takes place. Each of the cylinders 12, 14, 16, 18 has a respective intake port 20, 22, 24, 26 and a respective exhaust port 28, 30, 32, 34. As depicted in FIG. 1, the exhaust from one cylinder 18, referred to as the dedicated cylinder or dedicated EGR cylinder, is routed through an EGR conduit 36 to a mixer 38. The mixer 38 also receives inlet air through an inlet air duct 40. The mixer 38 combines the inlet air from the inlet air duct 40 with the EGR gas stream from the EGR conduit 36 to form an intake mixture. The intake mixture flows through an intercooler 42 and a throttle valve 44 to an intake manifold 46 coupled to the intake ports 20, 22, 24, 26. The exemplary engine depicted in FIG. 1 has four cylinders, one of which is solely dedicated to provide enriched EGR to itself and to the other cylinders 12, 14, 16. Thus in steady-state operation the engine ideally operates with 25% EGR.

With continued reference to FIG. 1, in the exemplary engine system shown an exhaust manifold 48 collects exhaust gas from the exhaust ports 28, 30, 32 of the non-dedicated cylinders 12, 14, 16 and routes this exhaust gas through the turbine 50 of a turbocharger 52 to an exhaust pipe 54. The turbocharger 52 also includes a compressor 70 which receives air from a mass air flow sensor 66, compresses that air, and provides the compressed air to the inlet air duct 40. Exhaust gas exits the exhaust pipe 54 through an exhaust after treatment device 56, such as a three-way catalytic converter (TWC), and through a tail pipe 58 to atmosphere. Additionally, the embodiment depicted in FIG. 1 includes an EGR bypass valve 60, which can direct exhaust gas flow from the dedicated cylinder 18 to the exhaust pipe 54 under engine operating conditions such as light load when combustion is too sensitive to EGR.

The embodiment depicted in FIG. 1 includes a first Universal Exhaust Gas Oxygen (UEGO) sensor 62 located to measure exhaust gas composition from the dedicated cylinder 18. FIG. 1 also includes a second UEGO 64 located at the exhaust manifold 48 to measure exhaust gas composition from the non-dedicated cylinders 12, 14, 16.

As shown in FIG. 1, the engine has an associated controller 68 that is communicatively coupled to sensors and actuators associated with the engine 10.

When a rich air-fuel mixture is combusted in the dedicated cylinder 18, some of the fuel in the mixture reforms to CO and $H_2$, which are reactive components that improve the tolerance of combustion in the other cylinders 12, 14, 16 to high levels of EGR dilution. Chemical reactions describing the combustion of gasoline can be modeled for both stoichiometric and rich air-fuel mixtures. For example, assuming the fuel is $C_8H_{18}$, stoichiometric combustion can be modeled by the following equation:

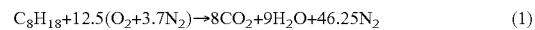

$$C_8H_{18}+12.5(O_2+3.7N_2) \rightarrow 8CO_2+9H_2O+46.25N_2 \qquad (1)$$

The stoichiometric air-fuel ratio of the nominal combustion reaction shown in Equation (1), $\lambda_s$, can be calculated to be 15.05.

Figure 2:
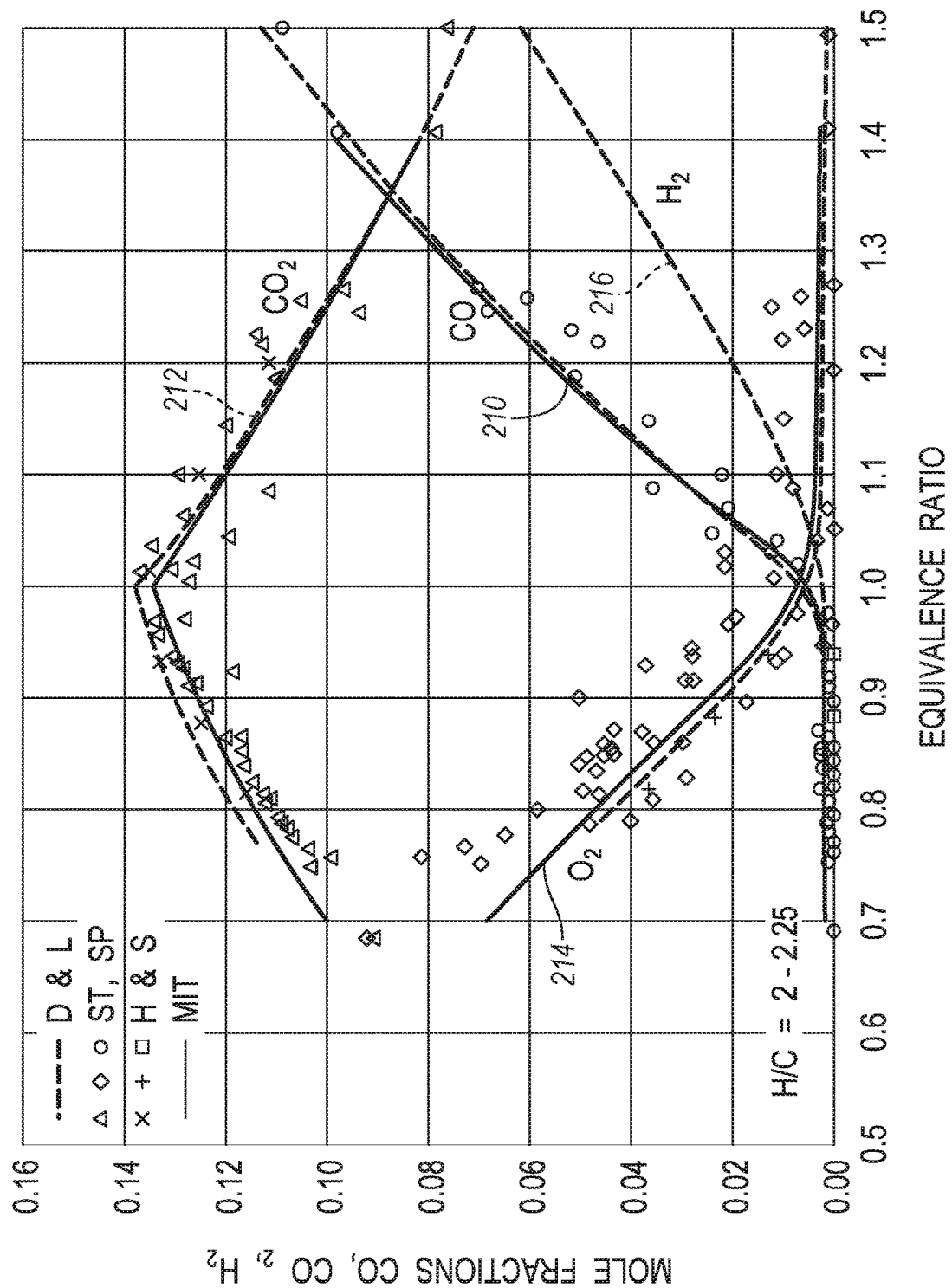
FIG. 2 is a plot of experimentally measured engine exhaust gas composition data as a function of equivalence ratio.

As the air-fuel mixture is enriched, some of the fuel reforms to CO and $H_2$ due to lack of sufficient oxygen to achieve complete combustion. Experimental results measured from several different multi- and single-cylinder automotive spark-ignition engines are shown in FIG. 2 (taken from *Internal Combustion Engine Fundamentals* by John B. Haywood, McGraw-Hill Education, 1988, pg. 147). Referring to FIG. 2, the mole fraction in the exhaust gas of CO is represented by the data series labeled 210, the mole fraction in the exhaust gas of $CO_2$ is represented by the data series labeled 212, the mole fraction in the exhaust gas of $O_2$ is represented by the data series labeled 214, and the mole fraction in the exhaust gas of $H_2$ is represented by the data series labeled 216. Each data point in each series 210, 212, 214, 216 is plotted against the equivalence ratio of the air-fuel mixture being combusted. As used in this plot, the equivalence ratio is calculated as the fuel/air ratio divided by the stoichiometric fuel/air ratio. Hence an equivalence ratio value less than 1 indicate combustion of a lean mixture, equivalence ratio of 1 indicates a stoichiometric mixture, and equivalence ratio greater than 1 indicates a rich mixture. The data in FIG. 2 was measured with fuels having H/C ratio, i.e. number of hydrogen atoms/number of carbon atoms, in the range of 2 to 2.25.

The results shown in FIG. 2 indicate that the ratio of mole fractions of CO shown in data series 210 and mole fractions of $H_2$ shown in data series 216 is almost constant and roughly equal to 2 when the air-fuel ratio is rich, i.e. equivalence ratio greater than 1. Based on this observation, the dominant reaction with a rich air-fuel mixture can be modeled by the following equation:

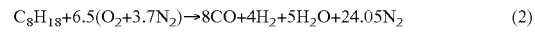

$$C_8H_{18}+6.5(O_2+3.7N_2) \rightarrow 8CO+4H_2+5H_2O+24.05N_2 \qquad (2)$$

The air-fuel ratio of the enriched combustion reaction shown in Equation (2), $\lambda_r$, can be calculated to be 7.83.

During a combustion event in the dedicated cylinder, some of the injected fuel reacts with air following Equation (1), while the rest of the fuel reacts following Equation (2). A given air mass $m_a$ reacts with fuel according to the relationship:

$$m_a = \lambda_r m_f^r + \lambda_s (m_f - m_f^r) \quad (3)$$

Where $m_f$ is the mass of fuel injected into the cylinder and $m_f^r$ is the mass of fuel that reacts with air in the cylinder according to rich combustion as described in Equation (2). Equation (3) can be rearranged to solve for $m_f^r$, recognizing that $m_f^r$ cannot exceed the total mass of fuel $m_f$ and that $m_f^r$ cannot be negative, to yield the relationship:

$$m_f^r = \min\left(\max\left(\frac{m_a - \lambda_s m_f}{\lambda_r - \lambda_s}, 0\right), m_f\right) \quad (4)$$

Figure 3:
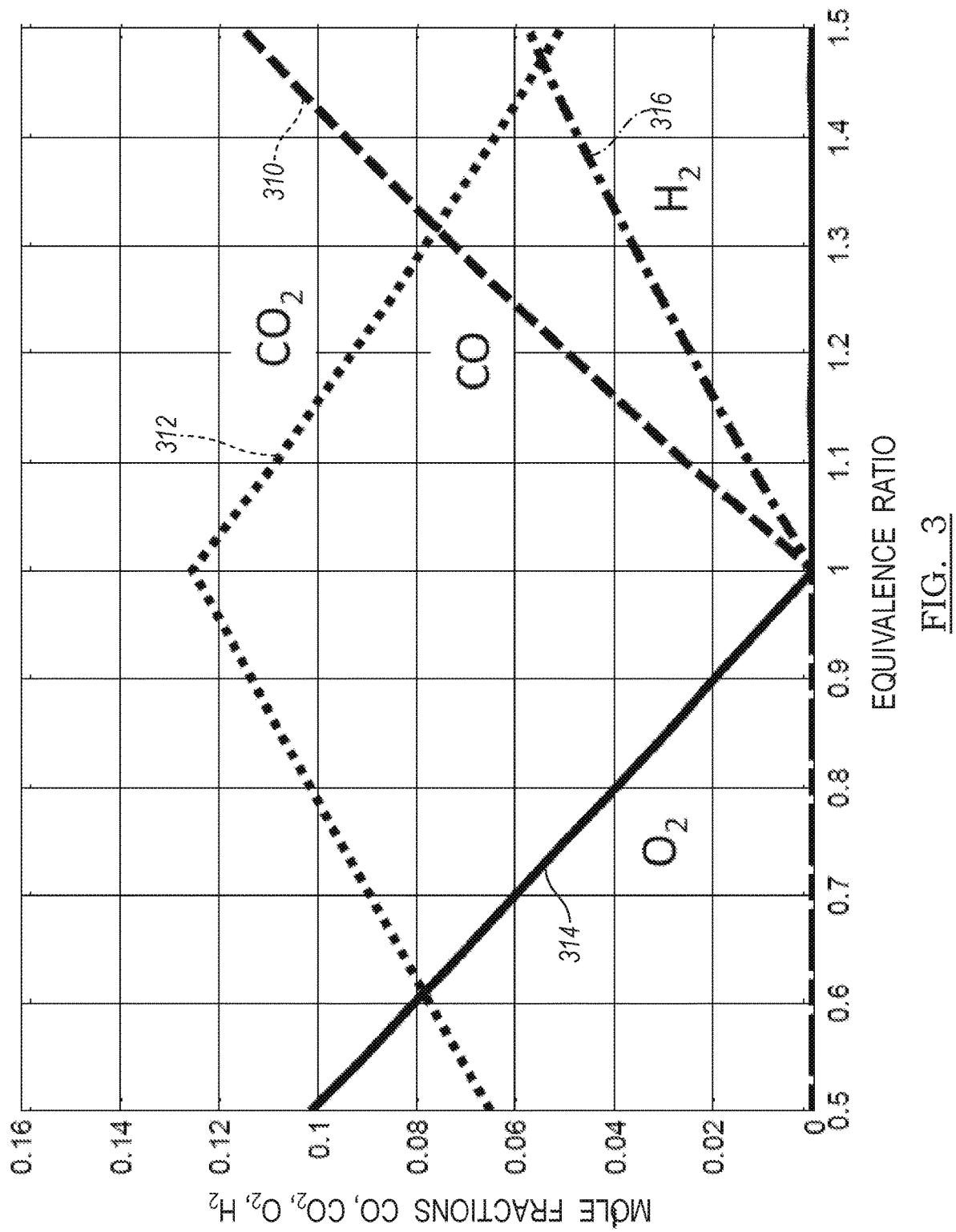
FIG. 3 is a plot of modeled exhaust gas composition as a function of equivalence ratio according to an exemplary embodiment.

Assuming that dissociation is negligible, the mole fractions of reactive compounds from the model described in Equations. (1), (2), (3), and (4) can be obtained as a function of equivalence ratio. These mole fractions are plotted in FIG. 3. Referring to FIG. 3, the modeled mole fraction in the exhaust gas of CO is represented by the data series labeled 310, the modeled mole fraction in the exhaust gas of $CO_2$ is represented by the data series labeled 312, the modeled mole fraction in the exhaust gas of $O_2$ is represented by the data series labeled 314, and the modeled mole fraction in the exhaust gas of $H_2$ is represented by the data series labeled 316. Each data point in each series 310, 312, 314, 316 is plotted against the modeled equivalence ratio of the air-fuel mixture. The plot in FIG. 3 shows that the model described in Equations. (1), (2), (3), and (4) captures the trend of the experimentally obtained mole fractions shown in FIG. 2.

The burned gas, i.e. the sum of the fuel and air that reacted with the fuel in a combustion event in the dedicated cylinder, is combined with inlet air and provided to the intake manifold. The burned gas fraction of the mixture in the intake manifold is the ratio of the burned gas mass to the total (burned gas+fresh air) mass. A dynamic model of burned gas fraction of a dedicated-EGR engine includes models of both the burned gas mass fraction at the intake manifold and the burned gas mass fraction at the exhaust port of the dedicated cylinder.

A dynamic model of the burned gas mass fraction at the intake manifold of a dedicated-EGR engine can be derived as:

$$\dot{f}_{int} = \frac{(f_{exh}^{Dcyl} - f_{int})W_{EGR} - f_{int}W_a}{m_{int}} \quad (5)$$

In equation (5), $f_{int}$ is the mass fraction of burned gas in the intake manifold, $f_{exh}^{Dcyl}$ is the mass fraction of burned gas in the exhaust port of the dedicated cylinder, $W_{EGR}$ is the mass flow rate of recirculated gas from the dedicated cylinder, $W_a$ is the air mass flow rate into the intake manifold, and $m_{int}$ is the mass of gases in the intake manifold.

A dynamic model of the burned gas mass fraction at the exhaust port of the dedicated cylinder of a dedicated-EGR engine can be derived as:

$$\dot{f}_{exh}^{Dcyl} = \frac{(f_{int} - f_{exh}^{Dcyl})\theta W_e - f_{exh}^{Dcyl}\delta W_f^{Dcyl} + (1+\lambda_s)W_{fs}^{Dcyl} + (1+\lambda_r)W_{fr}^{Dcyl}}{m_{exh}^{Dcyl}} \quad (6)$$

In equation (6), $W_e$ is the mass flow rate into the cylinders 12, 14, 16, 18, $\theta$ is the ratio of the mass flow rate into the dedicated cylinder to $W_e$ ($\theta$ is equal to 0.25 if $W_e$ is evenly distributed to the cylinders 12, 14, 16, 18), $W_f^{Dcyl}$ is the fuel mass flow rate into the dedicated cylinder, $\delta$ is a factor that represents uncertainty in fuel injectors which is equal to 1.0 if the fuel injection error is zero, $W_{fs}^{Dcyl}$ and $W_{fr}^{Dcyl}$ are the portion of the fuel mass flow that reacts in nominal stoichiometric combustion and the portion of the fuel mass flow that reacts in enriched combustion respectively, i.e., $\delta W_f^{Dcyl} = W_{fs}^{Dcyl} + W_{fr}^{Dcyl}$, and $m_{exh}^{Dcyl}$ is the mass of gases at the exhaust port of the dedicated cylinder.

Since exhaust gas from the dedicated cylinder is recirculated to the exhaust manifold, the following relationship holds unless the exhaust gas is bypassed:

$$W_{EGR} = \theta W_e + \delta W_f^{Dcyl} \quad (7)$$

In the dedicated-EGR engine, reformates generated during the combustion event are recirculated from the dedicated cylinder to the intake manifold as part of the EGR flow. Reformate mass fraction is defined as the ratio of the mass of reformates to the total mass in a volume. Assuming that CO and $H_2$ are the dominant reformates in the enriched exhaust gas, a dynamic model of reformate mass fraction can be derived as:

$$\dot{f}_{int}^{ref} = \frac{(f_{exh}^{refDcyl} - f_{int}^{ref})W_{EGR} - f_{int}^{ref}W_a}{m_{int}} \quad (8)$$

$$\dot{f}_{exh}^{refDcyl} = \frac{(f_{int}^{ref} - f_{exh}^{refDcyl})\theta W_e - f_{exh}^{refDcyl}\delta W_f^{Dcyl} + k\lambda_r W_{fr}^{Dcyl}}{m_{exh}^{Dcyl}} \quad (9)$$

In Equations (8) and (9), $f_{int}^{ref}$ and $f_{exh}^{refDcyl}$ represent the mass fractions of reformates in the intake manifold and the exhaust port of the dedicated cylinder, respectively, and k is the ratio of masses of reformates and the fuel reacted in enriched combustion (k=2.0351).

In implementing a dynamic model of mass fractions, readings from the Universal Exhaust Gas Oxygen (UEGO) sensor 62 located to measure exhaust gas composition from the dedicated cylinder 18 are used. The burned gas fraction measured by the UEGO sensor 62 is given by:

$$f_{exh}^{DcylUEGO} = f_{exh}^{Dcyl} + \varphi f_{exh}^{refDcyl} \quad (10)$$

In Equation 10, $f_{exh}^{DcylUEGO}$ is the burned gas fraction measured by the UEGO sensor 62 at the dedicated cylinder exhaust, and $\varphi$ is a constant that accounts for the difference in sensitivities of a UEGO sensor on exhaust gas compounds. The parameter $\varphi$ can be determined from UEGO sensor calibration provided by the manufacturer of the UEGO sensor. Given the relationship in Equation (10), the dynamic model in Equations (5) through (9) can be rewritten in terms of $f_{exh}^{DcylUEGO}$.

Since $f_{exh}^{DcylUEGO}$ is measured by a UEGO sensor 62 located at the exhaust port 34 of the dedicated cylinder 18, a dynamic observer can be designed. As an example, a reduced-order observer is designed based on the dynamic model of burned gas and reformate mass fractions developed earlier.

To design the reduced-order observer, a new variable z is introduced, $$z=[z_1 z_2 z_3]^T=[f_{int} f_{int}^{ref} f_{exh}^{ref}]^T - Lf_{exh}^{DcylUEGO} \quad (11)$$

where L is a 3×1 observer gain. The state equation of the reduced-order observer can be expressed by $$\dot{z} = Az + B\begin{bmatrix} W_{fs}^{Dcyl} \\ W_{fr}^{Dcyl} \end{bmatrix} + Cf_{exh}^{DcylUego} \quad (12)$$

The mass air flow into the cylinders 12, 14, 16, 18 is represented by the term $W_e^a$. In general $W_e^a$ can be measured accurately by the mass air flow sensor 66 in steady state operation, and is accurately estimated in the engine controller 68 during transients to achieve a stoichiometric air-fuel mixture in the non-dedicated cylinders 12, 14, 16.

Then, $W_{EGR}$ can also be approximated by the following equation:

$$W_{EGR} = \frac{\theta W_e^a}{1 - z_1} + \delta W_f^{Dcyl} \quad (13)$$

Steady state errors of the reduced-order observer are zero only if mass flow to the cylinders 12, 14, 16, 18 is known, i.e., if δ and θ are known. In a dedicated-EGR engine, cylinder flow may not be evenly distributed because the back pressure of the dedicated cylinder 18 may be different from the other cylinders 12, 14, 16 due to the geometry of the exhaust system. A method to compensate observer error due to uneven flow distribution is based on the second UEGO sensor 64 located at the exhaust manifold 48 to measure exhaust gas composition from the non-dedicated cylinders 12, 14, 16.

In conventional spark ignition (SI) engines, a UEGO sensor 64 is typically implemented at the exhaust manifold 48 to allow the engine controller 68 to achieve a stoichiometric air-fuel ratio and maximize the efficiency of the three-way catalytic converter (TWC) 56. In a dedicated-EGR engine, the air-fuel mixtures in the non-dedicated cylinders 12, 14, 16 are required to be lean to meet overall stoichiometric burned gas at the exhaust manifold when exhaust gas recirculated from the dedicated cylinder is enriched.

Assuming air-fuel mixtures of the non-dedicated cylinders 12, 14, 16 are lean, a dynamic model of burned gas reformate mass fractions can be derived as follows:

$$\dot{f}_{exh}^{ref} = \frac{(f_{int}^{ref} - f_{exh}^{ref})\sigma W_e - f_{exh}^{ref}\delta W_f}{m_{exh}} \quad (14)$$

$$\dot{f}_{exh} = \frac{(f_{int} - f_{exh})\sigma W_e - (1 + \lambda_s - f_{exh}^{ref})\delta W_f}{m_{exh}} \quad (15)$$

Where σ is the ratio of the mass flow rate into the non-dedicated cylinders 12, 14, 16 to $W_e$ (i.e. σ=1−δ), $W_f$ is the fuel mass flow rate into the non-dedicated cylinders 12, 14, 16, $f_{exh}^{ref}$ and $f_{exh}$ represent the reformate and burned gas mass fractions, respectively, in the exhaust manifold, and $m_{exh}$ is the mass of gases in the exhaust manifold.

The burned gas fraction measured by the UEGO sensor 64 at the exhaust manifold 48, $f_{exh}^{UEGO}$, can be expressed as $$f_{exh}^{UEGO} = f_{exh} + \varphi f_{exh}^{ref} \quad (16)$$

The dynamics of $f_{exh}^{UEGO}$ can be derived as follows:

$$\dot{f}_{exh}^{UEGO} = \frac{(f_{int} + \varphi f_{int}^{ref} - f_{exh}^{UEGO})\sigma W_e + (1 + \lambda_s - f_{exh}^{UEGO})\delta W_f}{m_{exh}} \quad (17)$$

In order to adapt the mass fractions dynamic models to compensate for uncertainties θ (the ratio of the mass flow rate into the dedicated cylinder to $W_e$) and δ (the factor that represents uncertainty in fuel injectors), a dynamic estimate of $f_{exh}^{UEGO}$ is derived as follows:

$$\dot{\hat{f}}_{exh}^{UEGO} = \frac{(\hat{f}_{int} + \varphi \hat{f}_{int}^{ref} - \hat{f}_{exh}^{UEGO})\hat{\sigma} W_e + (1 + \lambda_s - \hat{f}_{exh}^{UEGO})\hat{\delta} W_f}{m_{exh}} \quad (18)$$

Where $\hat{f}_{exh}^{UEGO}$, $\hat{\sigma}$, and $\hat{\delta}$ are the estimates of $f_{exh}^{UEGO}$, α, and δ respectively. For example, the estimates of σ and δ that minimize the error $\hat{f}_{exh}^{UEGO} - f_{exh}^{UEGO}$ can be obtained as follows:

$$\dot{\hat{\sigma}} = \frac{W_e}{c_1}(\hat{f}_{int} + \varphi \hat{f}_{int}^{ref} - \hat{f}_{exh}^{UEGO})(f_{exh}^{UEGO} - \hat{f}_{exh}^{UEGO}) \quad (19)$$

$$\dot{\hat{\delta}} = \frac{W_f}{c_2}(1 + \lambda_s - \hat{f}_{exh}^{UEGO})(f_{exh}^{UEGO} - \hat{f}_{exh}^{UEGO}) \quad (20)$$

where $c_1$ and $c_2$ are tuning parameters.

Figure 4:
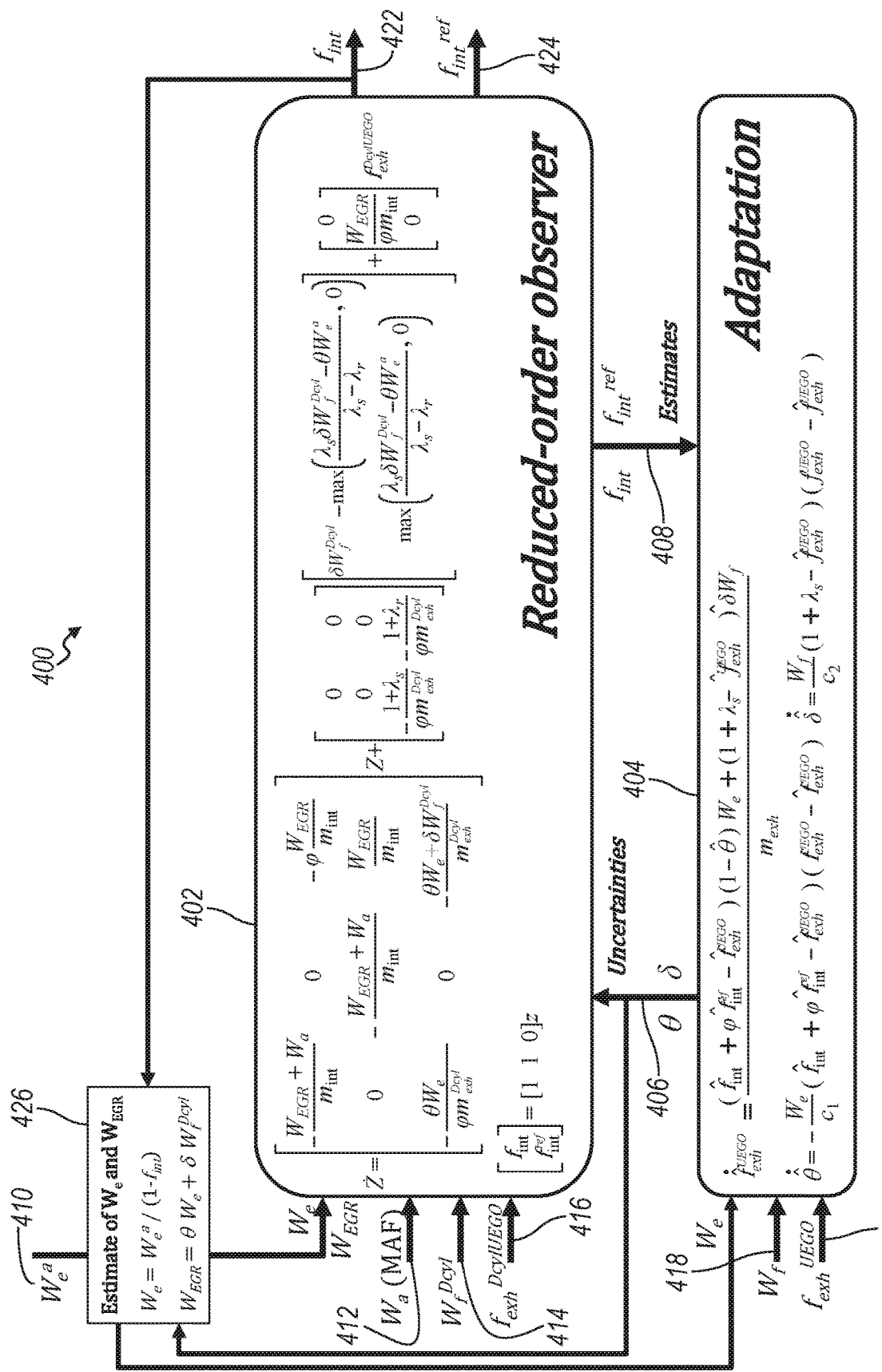
FIG. 4 is a diagram of a reduced-order observer according to an exemplary embodiment.

FIG. 4 is a diagram of an adaptive reduced-order observer 400 according to an embodiment of the present disclosure. With reference to FIG. 4, a reduced-order observer portion 402 and an adaptation portion 404 are depicted. The observer 400 has an input 410 representing $W_e^a$, the mass air flow into the cylinders 12, 14, 16, 18. In block 426, estimates of $W_e$ and $W_{EGR}$ are calculated and provided as inputs to the reduced-order observer portion 402. Other inputs to the reduced-order observer portion 402 include $W_a$ 412, $W_f^{Dcyl}$ 414, and $f_{exh}^{DcylUEGO}$ 416. With continued reference to FIG. 4, the reduced-order observer portion 402 also receives adapted estimates 406 of uncertainty terms θ and δ from the adaptation portion 404.

With continued reference to FIG. 4, the reduced-order observer portion 402 provides as outputs modeled values for $f_{int}$ 422 representing the mass fraction of burned gas in the intake manifold 46, and for $f_{int}^{ref}$ 424, representing the mass fraction of reformates in the intake manifold 46. The reduced-order observer portion 402 also provides $f_{int}$ and $f_{int}^{ref}$ as estimates 408 to the adaptation portion 404.

Figure 5:
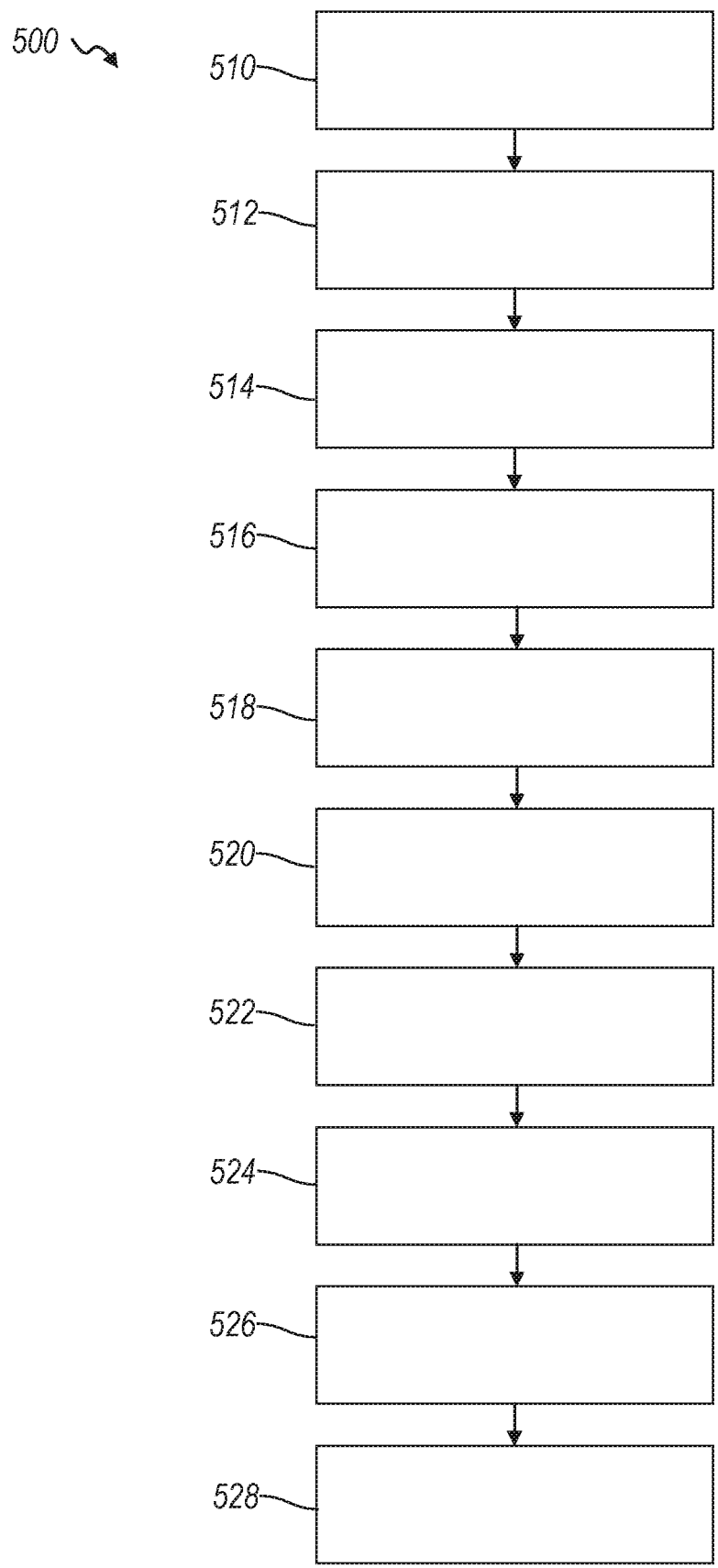
FIG. 5 is a flowchart of a method of operating a dedicated-EGR engine according to an exemplary embodiment.

A flowchart of a method 500 of operating a dedicated-EGR engine according to an exemplary embodiment of the present disclosure is presented in FIG. 5. With reference to FIG. 5, in step 510 a rich air-fuel mixture is provided to a dedicated cylinder. In step 512, the rich air-fuel mixture is combusted in the dedicated cylinder. In step 514, the combustion of the rich air-fuel mixture in the dedicated cylinder is modeled. In step 516, the composition of the combustion products in the dedicated cylinder is estimated based on interpolation of chemical reaction models of stoichiometric and rich combustion. In step 518 the combustion products from the dedicated cylinder are mixed with air to produce an intake mixture. With continued reference to FIG. 5, in step 520 a mass fraction of reformate in the intake mixture is estimated. In step 522, a mass fraction of burned gas in the intake mixture is estimated. In step 524, the intake mixture is provided to the intake ports of all of the cylinders of the dedicated-EGR engine. In step 526 an air-fuel mixture is combusted in a non-dedicated cylinder of the engine. In step 528, an engine control parameter effective to influence combustion in the non-dedicated cylinder is controlled, wherein the value to which the engine control parameter is controlled is determined based on the estimated mass fraction of reformate and the estimated mass fraction of burned gas in the intake mixture.

While the exemplary engine depicted is FIG. 1 is shown as having four cylinders, it will be appreciated that the teachings of the present disclosure can be applied to engines having fewer than four cylinders or to engines having more than four cylinders. Additionally, while the exemplary engine is shown as having a turbocharger to compress the inlet air, the teachings of the present disclosure are not limited to turbocharged engines. Also, while the exemplary engine is shown as having an intercooler 42 located in the intake flow path between the mixer 38 and the throttle valve 44, the teachings of the present disclosure are not limited to embodiments having an intercooler 42 located in the intake flow path between the mixer 38 and the throttle valve 44.

A method and system of the present disclosure offers several advantages. The presence of $H_2$ in the recirculated exhaust gas improves EGR tolerance and combustion stability and combustion efficiency in the non-dedicated cylinders. $H_2$ and CO increase the overall knock resistance of the engine, enabling operation at higher compression ratios with the accompanying benefits. The method and system of the present disclosure allow these benefits to be achieved without the cost of a dedicated gas composition sensor in the intake manifold.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term 'module' or the term 'controller' may be replaced with the term 'circuit.' The term 'module' may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A method of operating a dedicated-EGR engine, comprising the steps of:
   providing a rich air-fuel mixture to a dedicated cylinder;
   combusting the rich air-fuel mixture in the dedicated cylinder;
   modeling the combustion of the rich air-fuel mixture in the dedicated cylinder;
   estimating a composition of combustion products in the dedicated cylinder based on interpolation of chemical reaction models of stoichiometric and rich combustion;
   mixing the combustion products from the dedicated cylinder with air to produce an intake mixture;
   estimating a mass fraction of reformate in the intake mixture;
   estimating a mass fraction of burned gas in the intake mixture;
   providing the intake mixture to intake ports of all of the cylinders of the dedicated-EGR engine;
   combusting an air-fuel mixture in a non-dedicated cylinder of the engine;
   controlling an engine control parameter effective to influence combustion in the non-dedicated cylinder, wherein a value to which the engine control parameter is controlled is determined based on the estimated mass fraction of reformate and the estimated mass fraction of burned gas in the intake mixture.

2. The method of claim 1, wherein the step of controlling the engine control parameter comprises controlling fuel injection timing.

3. The method of claim 1, wherein the step of controlling the engine control parameter comprises controlling fuel injection quantity.

4. The method of claim 1, wherein the step of controlling the engine control parameter comprises controlling spark timing.

5. The method of claim 1, wherein the step of controlling the engine control parameter comprises controlling throttle position.

6. The method of claim 1, wherein the step of controlling the engine control parameter comprises controlling an EGR bypass valve.

7. The method of claim 1, wherein the step of controlling the engine control parameter comprises controlling a turbocharger waste gate.

8. The method of claim 1, wherein the step of controlling the engine control parameter comprises controlling engine intake valve timing or engine exhaust valve timing.

9. The method of claim 1, wherein the air-fuel mixture in the non-dedicated cylinder is adjusted to achieve overall stoichiometry at a catalytic converter disposed downstream of the non-dedicated cylinder.

10. A system comprising a dedicated-EGR engine; and a controller configured to:
    control provision of a rich air-fuel mixture to a dedicated cylinder;
    control combustion of the rich air-fuel mixture in the dedicated cylinder;
    model the combustion of the rich air-fuel mixture in the dedicated cylinder;
    estimate a composition of combustion products in the dedicated cylinder based on interpolation of chemical reaction models of stoichiometric and rich combustion;
    estimate a mass fraction of reformate in an intake mixture comprising combustion products from the dedicated cylinder and air;
    estimate a mass fraction of burned gas in the intake mixture;
    control provision of the intake mixture to intake ports of all of the cylinders of the dedicated-EGR engine;
    control combustion of an air-fuel mixture in a non-dedicated cylinder of the engine;
    control an engine control parameter effective to influence combustion in the non-dedicated cylinder, wherein a value to which the engine control parameter is controlled is determined based on the estimated mass fraction of reformate and the estimated mass fraction of burned gas in the intake mixture.

11. The system of claim 10, wherein the engine control parameter is fuel injection timing.

12. The system of claim 10, wherein the engine control parameter is fuel injection quantity.

13. The system of claim 10, wherein the engine control parameter is spark timing.

14. The system of claim 10, wherein the engine control parameter is throttle position.

15. The system of claim 10, wherein the engine control parameter is EGR bypass valve position.

16. The system of claim 10, wherein the engine control parameter is turbocharger waste gate position.

17. The system of claim 10, wherein the engine control parameter is at least one of engine intake valve timing and engine exhaust valve timing.

18. A controller comprising a processor and a non-transitory computer-readable medium containing instructions that, when executed, perform the method comprising the steps of:
    controlling provision of a rich air-fuel mixture to a dedicated cylinder;
    controlling combustion of the rich air-fuel mixture in the dedicated cylinder;
    modeling the combustion of the rich air-fuel mixture in the dedicated cylinder;
    estimating a composition of combustion products in the dedicated cylinder based on interpolation of chemical reaction models of stoichiometric and rich combustion;
    estimating a mass fraction of reformate in an intake mixture comprising the combustion products from the dedicated cylinder and air;
    estimating a mass fraction of burned gas in the intake mixture;
    controlling provision of the intake mixture to intake ports of all of the cylinders of the dedicated-EGR engine;
    controlling combustion of an air-fuel mixture in a non-dedicated cylinder of the engine; and
    controlling an engine control parameter effective to influence combustion in the non-dedicated cylinder, wherein a value to which the engine control parameter is controlled is determined based on the estimated mass fraction of reformate and the estimated mass fraction of burned gas in the intake mixture.

19. The controller of claim 18, wherein the engine control parameter is selected from the group consisting of fuel injection timing, fuel injection quantity, spark timing, throttle position, EGR bypass valve position, turbocharger waste gate position, engine intake valve timing, and engine exhaust valve timing.

* * * * *